(12) United States Patent
Salman et al.

(10) Patent No.: US 10,739,175 B1
(45) Date of Patent: Aug. 11, 2020

(54) MICROFLOW SENSOR AND FLOW SENSOR PACKAGE

(71) Applicant: KING FAISAL UNIVERSITY, Al-Ahsa (SA)

(72) Inventors: Saed Amin Salman, Al Mubarraz (SA); Abdullah Ibraheem Aljaafari, Al-Hufuf (SA); Adil Ahmed Al Shoaibi, Al-Hufuf (SA); Osama Faisal Alborno, Tempe, AZ (US)

(73) Assignee: King Faisal University, Al-Ahsa (SA)

( * ) Notice: Subject to any disclaimer, the term of this patent is extended or adjusted under 35 U.S.C. 154(b) by 0 days.

(21) Appl. No.: 16/785,546

(22) Filed: Feb. 7, 2020

(51) Int. Cl.
*G01F 1/68* (2006.01)
*G01F 1/69* (2006.01)
*G01F 1/684* (2006.01)

(52) U.S. Cl.
CPC .................. *G01F 1/6845* (2013.01)

(58) Field of Classification Search
CPC ...................... G01F 1/68; G01F 1/69
See application file for complete search history.

(56) References Cited

U.S. PATENT DOCUMENTS

| | | | | |
|---|---|---|---|---|
| 4,542,650 A * | 9/1985 | Renken | ............... | G01F 1/6965 338/319 |
| 5,600,174 A * | 2/1997 | Reay | ............... | G01F 1/6845 257/401 |
| 6,933,164 B2 | 8/2005 | Kubena | | |
| 6,981,410 B2 * | 1/2006 | Seki | ............... | G01F 1/6845 73/204.26 |
| 7,500,392 B1 * | 3/2009 | Plowman | ............... | G01F 1/6845 73/204.26 |
| 7,603,898 B2 * | 10/2009 | Speldrich | ............... | G01F 15/006 73/204.26 |
| 7,703,339 B2 | 4/2010 | Sulouff, Jr. et al. | | |
| 7,793,410 B2 | 9/2010 | Padmanabhan et al. | | |
| 7,905,140 B2 * | 3/2011 | Kanne | ............... | B01L 3/502707 73/204.26 |
| 8,166,814 B2 * | 5/2012 | Ike | ............... | G01F 1/6845 29/620 |

(Continued)

OTHER PUBLICATIONS

"Micro-Flow Based Differential Pressure Sensor", Microbridge Technologies Canada, Inc., (Oct. 2008), www.edn.com/Pdf/ViewPdf?contentitemid=4136044, 7 pages.

(Continued)

*Primary Examiner* — Jewel V Dowtin
(74) *Attorney, Agent, or Firm* — Richard C. Litman; Nath, Goldberg & Meyer (57) ABSTRACT

The microflow sensor includes a base wafer having opposed upper and lower surfaces, and a cap wafer, also having opposed upper and lower surfaces. The base wafer and the cap wafer may be formed from a semiconductor material. A flow sensing element is embedded in the upper surface of the base wafer. The flow sensing element may be any suitable type of flow sensing element, such as a central heater and at least one temperature-sensitive element. A flow channel is formed in the lower surface of the cap wafer and extends continuously between first and second longitudinally opposed edges of the cap wafer. The lower surface of the cap wafer is bonded to the upper surface of the base wafer such that fluid flowing through the flow channel passes above and across the sensing element.

6 Claims, 6 Drawing Sheets

(56) References Cited

U.S. PATENT DOCUMENTS

| | | | |
|---|---|---|---|
| 8,677,818 | B2 | 3/2014 | Landsberger et al. |
| 9,072,464 | B2 * | 7/2015 | Haartsen ............... A61B 5/1117 |
| 9,687,178 | B2 | 6/2017 | Roxhed et al. |
| 10,107,662 | B2 * | 10/2018 | Cook ..................... G01F 15/006 |
| 10,139,256 | B2 * | 11/2018 | Zhao ..................... G01F 1/6845 |
| 10,151,612 | B2 | 12/2018 | Hunziker et al. |
| 2010/0210008 | A1 * | 8/2010 | Strand ............... B01L 3/502715 |
| | | | 435/287.1 |
| 2011/0252882 | A1 * | 10/2011 | Beck ..................... G01F 1/6845 |
| | | | 73/204.27 |
| 2014/0007671 | A1 * | 1/2014 | Ike .......................... G01F 1/692 |
| | | | 73/204.26 |
| 2014/0207014 | A1 | 7/2014 | Roxhed et al. |
| 2016/0339431 | A1 | 11/2016 | Shmilovich et al. |
| 2018/0356264 | A1 | 12/2018 | Zhu et al. |

OTHER PUBLICATIONS

Frolov, "A Microflow-Based Differential Pressure Sensor", Sensors Magazine (2009), www.sensorsmag.com/embedded/a-microflow-based-differential-pressure-sensor, 11 pages.

* cited by examiner

MICROFLOW SENSOR AND FLOW SENSOR PACKAGE

BACKGROUND

1. Field

The disclosure of the present patent application relates to fluid measurement and testing, and particularly to a microflow sensor and a flow sensor package including the microflow sensor.

2. Description of the Related Art

Semiconductor flow sensors, such as thermoanemometers and the like, are devices used in the measurement and testing of flow and differential pressure in gases and liquids. The flow sensors are typically provided in the form of a semiconductor chip, which includes a central microscopically sized flow channel, allowing fluid to flow over an internal sensing element. In a thermoanemometer, for example, the sensing element typically includes a central heater and a pair of temperature-sensitive elements symmetrically disposed on opposite sides of the heater. The heater heats a local volume of gas or liquid in the flow through the channel, which is pushed over the distal temperature sensing element in the flow path and induces a temperature differential in the two temperature-sensitive elements, which is further converted into an electrical signal that can be analyzed external to the flow sensor.

Figure 2:
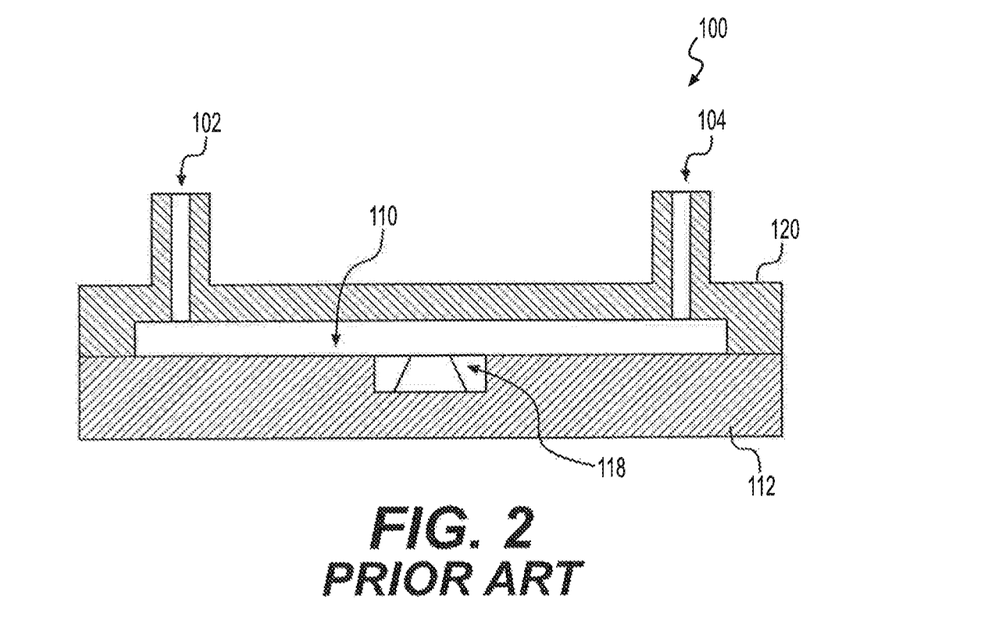
FIG. 2 is a side view in section of a prior art flow sensor packaged semiconductor.

FIG. 2 illustrates a prior art semiconductor flow sensor 100, including a semiconductor chip 118 mounted on a semiconductor package base 112, which is covered by a package cap 120. The bottom of the package cap 120 defines a flow passage 110, such that fluid flowing through inlet port 102 and out of outlet port 104 passes over and across the semiconductor chip 118 having the flow sensing elements defined thereon. The flow channel 110 is defined by the package. Although effective, such flow sensors must be manufactured as individual units, thus making them susceptible to misalignment variations between the package and the sensing elements on the semiconductor chip, in addition to relatively high costs of manufacture.

Other known flow sensors, such as those shown in FIGS. 2a-2e of U.S. Pat. No. 8,677,818, issued Mar. 35, 2014 to Landsberger et al., which is hereby incorporated by reference in its entirety, have flow channels defined in the semiconductor chip itself. In this case, inlet and outlet openings to and from the flow channel may be formed in the top and bottom surfaces of the chip, respectively, in either the top or bottom surface and in the side of the chip, or both openings may be formed in either the top surface or the bottom surface of the chip. In any case, this construction may require forming inlet and outlet ports or vents in the packaging and aligning the ports in the packaging with the flow channel openings in the semiconductor chip. Again, the process is expensive and subject to misalignment between the semiconductor packaging and the chip. Thus, a microflow sensor and flow sensor package solving the aforementioned problems is desired.

SUMMARY

The microflow sensor includes a base wafer having opposed upper and lower surfaces, and a cap wafer, also having opposed upper and lower surfaces. The base wafer and the cap wafer may be formed from a semiconductor material, such as silicon. A flow sensing element is embedded in the upper surface of the base wafer. A longitudinally or linearly extending flow channel is formed in the lower surface of the cap wafer and extends continuously between first and second opposed edges of the cap wafer. The longitudinally extending flow channel may have a central portion positioned above the flow sensing element, where the central portion has a lateral width greater than the lateral width of the remainder of the longitudinally extending flow channel. The lower surface of the cap wafer is bonded to the upper surface of the base wafer such that fluid flowing through the longitudinally extending flow channel passes above and across the sensing element.

It should be understood that the flow sensing element may be any suitable type of flow sensing element. For example, the flow sensing element may include a central heater and a pair of temperature-sensitive elements positioned adjacent to and symmetrically disposed on opposite sides of the central heater, similar to a conventional thermoanemometer-flow sensor. As is well known in the art, the temperature-sensitive elements may each be, for example, a thermoresistor or a thermocouple. In this example, the sensing element is disposed transverse to the direction of fluid flow, so that the fluid passes over a first temperature sensitive element, then the heater, and then the second temperature sensitive element. The heater heats gas or liquid flow passing in close proximity to the heater, which then passes over the second temperature sensitive element, producing a temperature differential between the two temperature-sensitive elements, which is further converted into an electrical signal. The flow sensing element is calibrated to the flow parameter of interest, as known in the art.

Multiple flow sensors may be produced simultaneously by etching a plurality of longitudinally extending flow channels in a lower surface of a cap wafer sheet. Each longitudinally extending flow channel extends continuously in a straight line between opposed edges of the cap wafer sheet. A plurality of the flow sensing elements are embedded in an upper surface of a base wafer sheet, such that the plurality of flow sensing elements are rectangularly arrayed in rows and columns. The rows are aligned with the plurality of flow channels etched in the lower surface of the cap wafer sheet. The lower surface of the cap wafer sheet is then bonded to the upper surface of the base wafer sheet to form an array of flow sensors.

The bonded cap wafer sheet and base wafer sheet are first diced parallel to and between adjacent flow channels, and then between adjacent columns of the flow sensing elements, which provides access openings to the flow channel on opposite edges of each die formed by dicing the bonded wafers.

The flow sensor may be integrated into a flow sensor package. In one exemplary embodiment, the package may include a package substrate and a hollow package cover, which is mounted on the substrate to define an open interior region. The hollow cover is provided with first and second laterally opposed fluid flow ports. The flow sensor is mounted on the substrate with the flow channel aligned in the same direction as the ports. A longitudinally extending fluid barrier may be mounted between the upper surface of the cap wafer and the inner surface of the hollow cover transverse to the direction of fluid flow to define an inlet chamber and an outlet chamber, and to prevent unwanted fluid cross-flow or mixing of the inlet fluid with the outlet fluid within the package.

These and other features of the present invention will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 3:
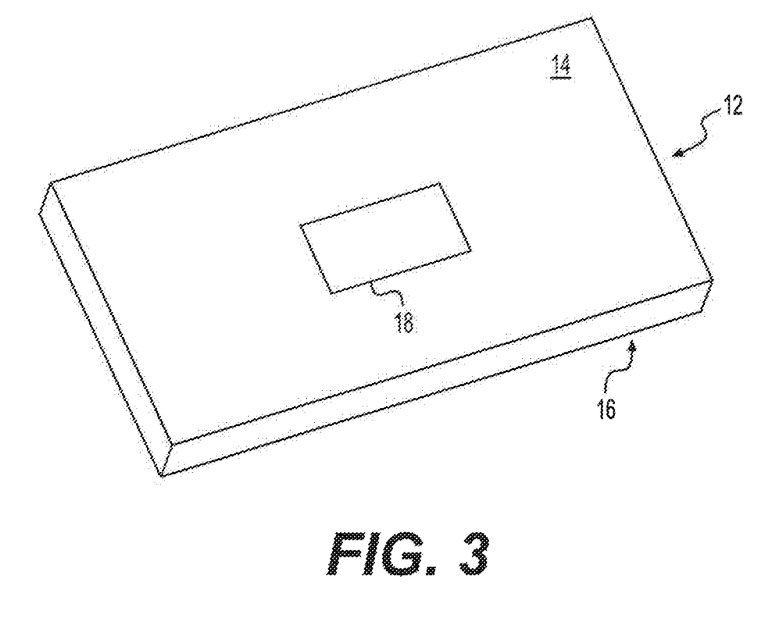
FIG. 3 is diagrammatic perspective view of a base wafer of the microflow sensor semiconductor chip of FIG. 1 as seen from above.
Figure 4:
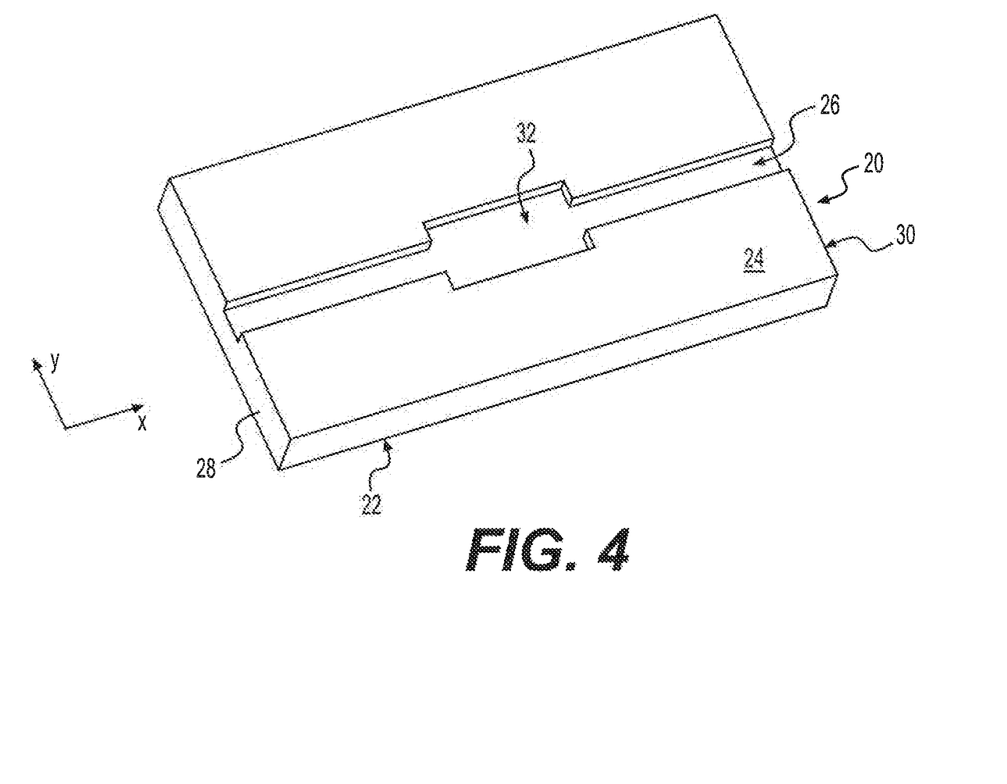
FIG. 4 is a perspective view of the cap wafer of the microflow sensor semiconductor chip of FIG. 1, showing the lower surface of the cap wafer.
Figure 5:
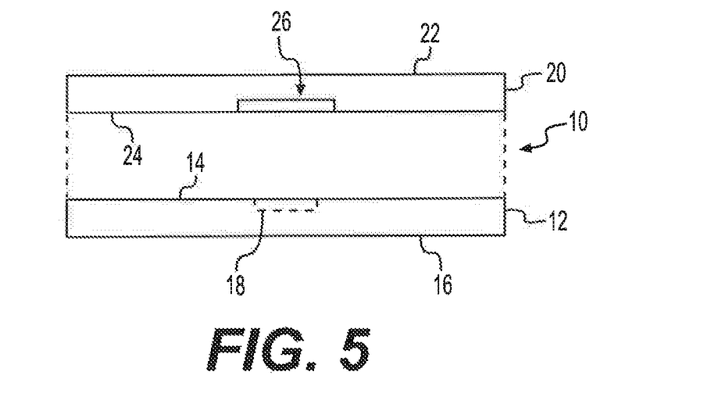
FIG. 5 is a partially exploded side view of the microflow sensor semiconductor chip of FIG. 1, showing the cap wafer raised above the base wafer.

Referring to FIGS. 1, 3, 4 and 5, the microflow sensor 10 includes a base wafer 12, having opposed upper and lower surfaces 14, 16, respectively, and a cap wafer 20, also having opposed upper and lower surfaces 22, 24, respectively. The base wafer 12 and the cap wafer 20 may be formed from a semiconductor material, such as silicon or the like. A flow sensing element 18 is embedded in the upper surface 14 of the base wafer 12. As shown in FIGS. 3 and 5, the upper sensing face of the flow sensing element 18 may be flush with the upper surface 14 of the base wafer 12. It should be understood that the vertical orientation shown in FIG. 5 may be reversed; i.e., the base wafer 12 and the cap wafer 20, as will be described in greater detail below, may be interchanged.

Figure 1:
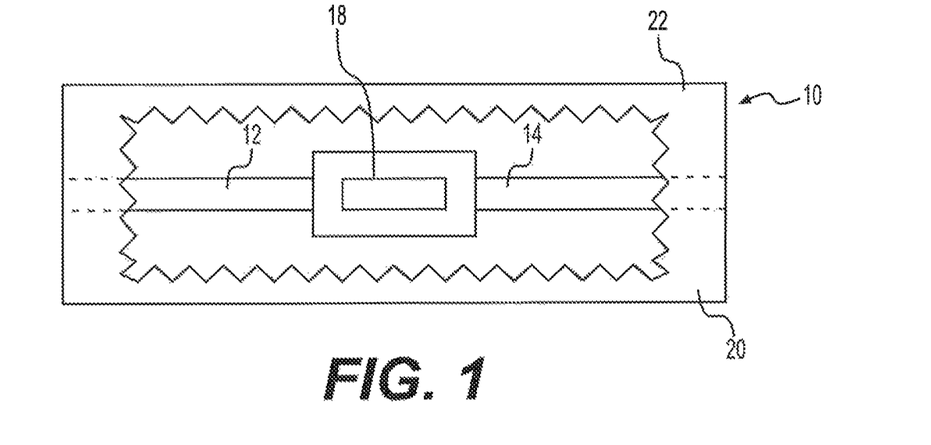
FIG. 1 is a diagrammatic top view of a microflow sensor semiconductor chip, shown with the cap wafer broken away to show details of the interior of the chip.

As best shown in FIGS. 1 and 4, a longitudinally or linearly extending flow channel 26 is formed in the lower surface 24 of the cap wafer 20 and extends continuously between first and second longitudinally opposed edges 28, 30 of the cap wafer 20, defining a fluid inlet and a fluid outlet in the edges 28, 30, as shown, such that the longitudinally extending flow channel 26 provides edge-to-edge fluid flow. The longitudinally extending flow channel 26 may be formed by conventional etching or the like. In FIG. 4, the longitudinal direction corresponds to the x-axis, and the orthogonal lateral direction corresponds to the y-axis.

The longitudinally extending flow channel 26 may have a central portion 32 positioned above the sensing element 18, where the central portion 32 has a lateral width greater than the lateral width of the remainder of the longitudinally extending flow channel 26, which may be uniform in width. The dimensions of the central portion 32, as well as the lateral width of the remainder of the longitudinally extending flow channel 26, along with its depth, may be selected to control the pneumatic impedance of the microflow sensor 10. The pneumatic impedance is a parameter that defines the sensor performance (i.e., its sensitivity), as well as its lifespan, which is typically limited by dust-induced clogging. As shown, the lower surface 24 of the cap wafer 20 is bonded to the upper surface 14 of the base wafer 12 (e.g., by adhesive) such that fluid flowing through the longitudinally extending flow channel 26 passes above and across the sensing element 18. Along with the selection of the abovementioned parameters, the thickness of the adhesive layer may also be selected in order to control the pneumatic impedance of the flow sensor.

It should be understood that the flow sensing element 18 may be any suitable type of flow sensing element. For example, the flow sensing element 18 may include a central heater and a pair of temperature-sensitive elements positioned adjacent to, and symmetrically arranged about, the central heater, similar to a conventional thermoanemometer-type thermal sensor. As is well known in the art, the temperature-sensitive elements may each be, for example, a thermoresistor or a thermocouple. In this example, gas or liquid flow passing transversely over the sensing element 18, through the longitudinally extending flow channel 26 is heated in the vicinity of the central heater and passes on to the next temperature sensing element in the flow path, causing a temperature difference between the two temperature-sensitive elements, which is further converted into an electrical signal corresponding to a parameter of fluid flow.

Figure 6:
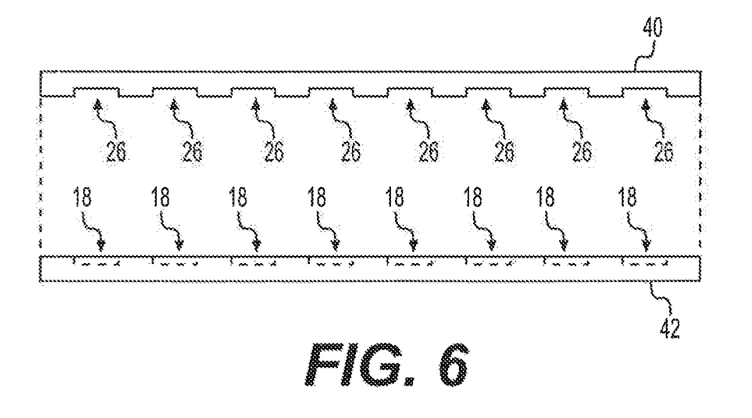
FIG. 6 is a partially exploded side view of a cap wafer sheet being attached to a base wafer sheet in a method of making the microflow sensor semiconductor chip of FIG. 1.
Figure 7:
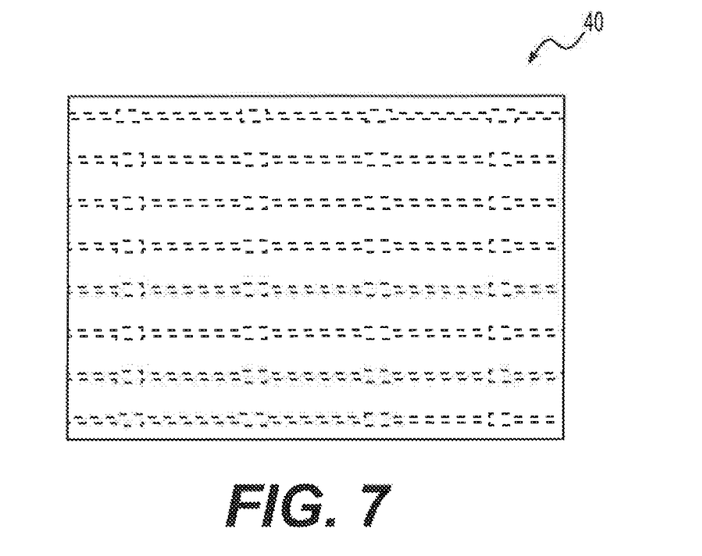
FIG. 7 is a top view of the cap wafer sheet of FIG. 6, shown attached to the base wafer sheet.

As shown in FIGS. 6 and 7, multiple microflow sensors 10 may be produced simultaneously by etching a plurality of longitudinally extending flow channels 26 in a lower surface of a cap wafer sheet 40. Each longitudinally extending flow channel 26 extends continuously between longitudinally opposed edges of the cap wafer sheet 40. A plurality of the flow sensing elements 18 are embedded in an upper surface of a base wafer sheet 42, such that the plurality of flow sensing elements 18 are in a rectangular array of rows and columns. As illustrated in FIG. 7, the longitudinally extending rows are aligned with the plurality of longitudinally extending flow channels 26 etched in the lower surface of the cap wafer sheet 40. The lower surface of the cap wafer sheet 40 is then bonded to the upper surface of the base wafer sheet 42 to form the array of unseparated flow sensors shown in FIG. 7.

As illustrated in FIG. 6, the longitudinally extending flow channels 26 are etched in the lower surface of the cap wafer sheet 40 prior to the bonding process. Similarly, the flow sensing elements 18 (and any necessary circuit interconnects, which are not shown here for purposes of simplification) are fabricated directly on the base wafer sheet 42, also prior to bonding. The longitudinally extending flow channels 26 are completely formed when the cap wafer sheet 40 is bonded to the base wafer sheet 42, which may be performed using an adhesive material or the like.

Figure 8:
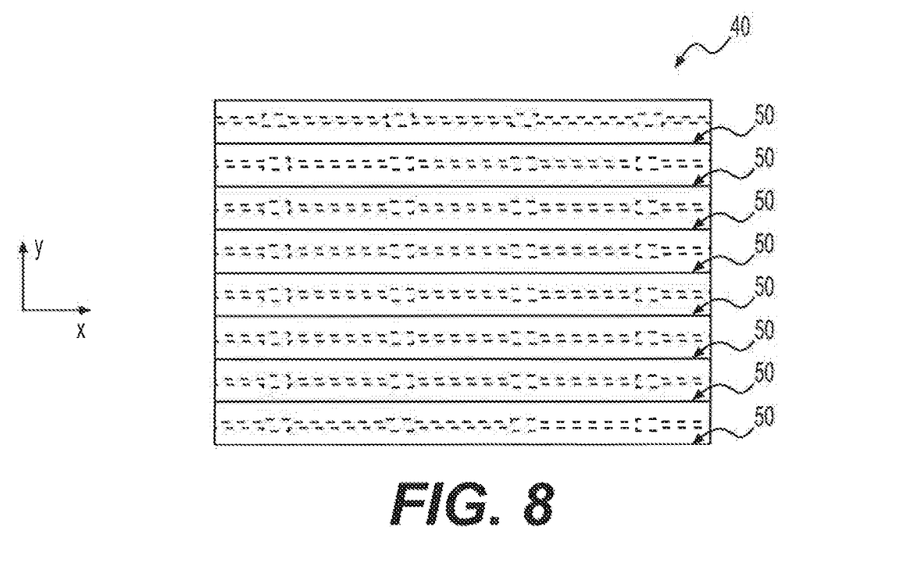
FIG. 8 is a top view of the assembled wafer sheets of FIGS. 6 and 7, showing locations where the assembled wafer sheets are diced between the flow channels in a method of making the microflow sensor semiconductor chip of FIG. 1.
Figure 9:
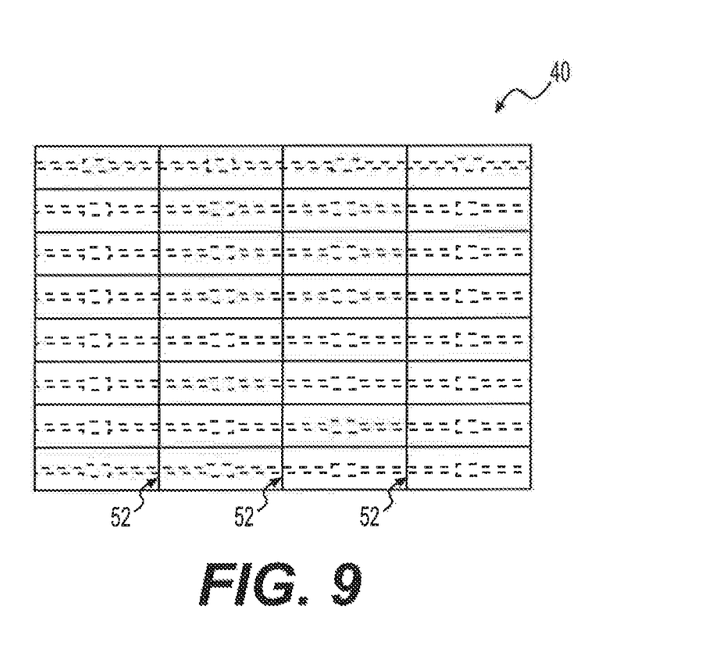
FIG. 9 is a top view of the assembled wafer sheets of FIGS. 6, 7 and 8, showing locations where the assembled wafer sheets are diced between columns of the flow sensor elements, forming flow channel inlets and outlets in a method of making the semiconductor flow sensor chip of FIG. 1.

As shown in FIG. 8, the bonded cap wafer sheet 40 and base wafer sheet 42 are longitudinally diced between adjacent rows of the longitudinally extending rows of the flow sensing elements 18 and between adjacent rows of the longitudinally extending flow channels 26. In FIG. 8, scribe lines 50 show locations where longitudinally extending rows of flow sensors are separated from one another by the longitudinal dicing. The bonded cap wafer sheet 40 and base wafer sheet 42 are then laterally diced between adjacent ones of the laterally extending columns of the sensing elements 18 to form a plurality of the microflow sensors. In FIG. 9, scribe lines 52 show where the laterally extending columns of flow sensors are separated from one another by the lateral dicing, thus producing a plurality of now-separated microflow sensors 10, and simultaneously defining inlet and outlet ports for the flow channel in each of the semiconductor chips formed by the dicing process.

In the above process, the longitudinal dicing of FIG. 8 may be performed prior to the lateral dicing of FIG. 9. The lateral dicing of FIG. 9 is the step which creates the edge-to-edge openings (i.e., the inlets and outlets) of each individual microflow sensor 10. However, in order to avoid clogging of these openings with dicing debris, the longitudinal dicing of FIG. 8 is performed first. During the dicing process, a vacuum or other source of suction may be used to simultaneously remove any dicing debris from the vicinity.

As noted above, microflow sensors 10 may be provided with circuit interconnects for delivering signals to and from sensing elements 18, as is conventionally known. The circuit interconnects are not shown for purposes of illustration and simplification, although it should be understood that the microflow sensors 10 may include any such conventional circuitry or other electronic elements. Typically, in semiconductor-type flow sensors, an array of openings are formed through the cap wafer, allowing for formation and passage of the interconnects.

Figure 10:
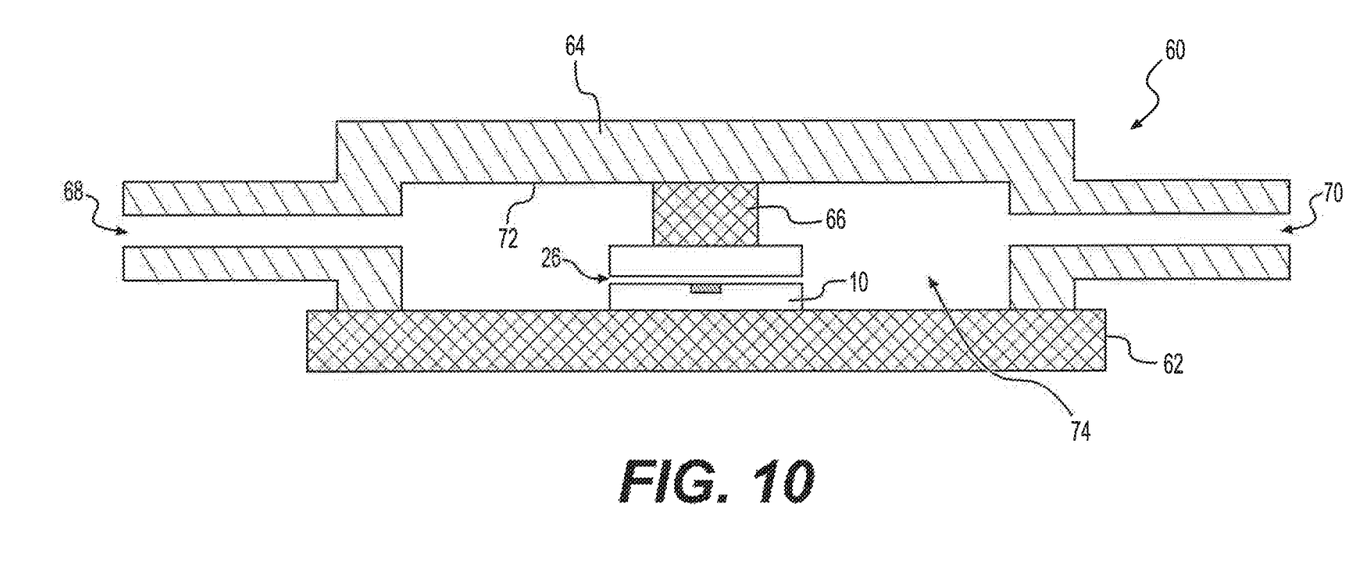
FIG. 10 is a side view in section of an exemplary flow sensor package including the semiconductor flow sensor chip of FIG. 1.

As shown in FIG. 10, the microflow sensor 10 may be integrated into a flow sensor package 60, which includes a package substrate 62 and a hollow package cover 64. As is conventionally known in the field of flow sensors, such packages are typically provided for ease of use, particularly for chip and semiconductor-based flow sensors, such as microflow sensor 10, which are typically relatively small in overall size. The flow sensor package 60 allows for ease of connection to macroscopic sources of fluid to be tested and measured.

The hollow cover 64 is mounted on the substrate 62 to define an open interior region 74. The hollow cover 64 is provided with first and second laterally opposed fluid flow ports 68, 70. The microflow sensor 10 is mounted on the substrate 62 within the open interior region 74 with the flow channel 26 aligned in the same direction as the ports 68, 70. A longitudinally extending fluid barrier 66 may be mounted between the upper surface of the cap wafer of flow sensor 10 and an inner surface 72 of the hollow cover 64 transverse to the direction of fluid flow to define an inlet chamber and an outlet chamber and to prevent unwanted fluid cross-flow within the package 60. It should be understood that the overall configuration of the hollow cover 64 and the substrate 62 are shown for exemplary purposes only. Similarly, it should be understood that the fluid flow ports 68, 70 are shown for exemplary purposes only, and may be adapted for connection to any suitable supply of fluid to be analyzed, including any suitable type of nozzles, connectors or the like. It will further be noted that the package 60 is exemplary only, and that the microflow sensor 10 may be mounted in any other semiconductor package that allows for fluid flow through the sensor 10 from one side through the opposite side.

It is to be understood that the microflow sensor and flow sensor package are not limited to the specific embodiments described above, but encompass any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A microflow sensor, comprising:
  a base wafer of semiconductor material having opposed upper and lower surfaces;
  a flow sensing element mounted on the base wafer and exposed at the upper surface of the base wafer; and
  a cap wafer of semiconductor material having opposed upper and lower surfaces and opposed side edges, the lower surface of the cap wafer having a fluid flow channel defined therein extending continuously between and through the opposed side edges of the cap wafer, the lower surface of the cap wafer being bonded to the upper surface of the base wafer with the fluid flow channel aligned with the flow sensing element so that a fluid flowing through the fluid flow channel passes above and across the exposed flow sensing element, the fluid flow channel defining a fluid inlet and a fluid outlet, respectively, where the fluid flow channel extends through the opposed side edges of the cap wafer wherein the fluid flow channel has a central portion positioned above the flow sensing element when the base wafer is bonded to the cap wafer, the fluid flow channel having a width, the central portion having a width, greater the width of the fluid flow channel extending between the flow sensing element and the opposed side edges of the cap wafer.

2. The microflow sensor as recited in claim 1, further comprising a semiconductor package having a first side and an opposed second side, a fluid inlet port disposed in the first side, and a fluid outlet port disposed in the opposed second side, the bonded wafers being mounted with the semiconductor package with the microflow sensor fluid inlet aligned with the semiconductor package fluid inlet port and the microflow sensor fluid outlet aligned with the semiconductor package fluid outlet port.

3. The microflow sensor as recited in claim 1, wherein said flow sensing element comprises a semiconductor flow sensing element.

4. The microflow sensor as recited in claim 1, wherein said flow sensing element comprises a thermoanemometer-flow sensor having a heater element and first and second temperature sensing elements symmetrically disposed on opposite sides of the heater element, the thermoanemometer-flow sensor being disposed transverse to a direction of fluid flow between the fluid inlet and the fluid outlet.

5. A flow sensor package, comprising:
  a packages substrate;
  a hollow package cover mounted on the substrate to define an open interior region, the hollow package cover having first and second opposed fluid flow ports; and
  a flow sensor mounted on the substrate within the open interior region, the flow sensor having:
    a base wafer having opposed upper and lower surfaces;
    a flow sensing element embedded in the upper surface of the base wafer; and
    a cap wafer having opposed upper and lower surfaces and opposed side edges, the lower surface of the cap wafer having a fluid flow channel defined therein extending continuously between and through the opposed side edges of the cap wafer, the fluid flow channel defining a fluid inlet and an opposed fluid outlet where the fluid flow channel extends through the opposed side edges of the cap wafer, the lower surface of the cap wafer being bonded to the upper surface of the base wafer with the fluid flow channel aligned above the flow sensing element such that fluid flowing through the fluid flow channel passes above and across the sensing element, the fluid inlet and the fluid outlet being aligned with the first and second opposed fluid flow ports, respectively wherein the fluid flow channel has a central portion positioned above the flow sensing element when the base wafer is bonded to the cap wafer, the fluid flow channel, having a width, the central portion having a width greater the width of the fluid flow channel extending between the flow sensing element and the opposed side edges of the cap wafer.

6. The flow sensor package as recited in claim 5, further comprising a longitudinally extending fluid barrier mounted between the upper surface of the cap wafer and an inner surface of the hollow cover transverse to the fluid flow channel, the barrier defining a fluid inlet chamber and a fluid outlet chamber.

\* \* \* \* \*